United States Patent [19]
Ishibashi et al.

[11] Patent Number: 5,777,967
[45] Date of Patent: Jul. 7, 1998

[54] OPTICAL DISK DEVICE

[75] Inventors: Hiromichi Ishibashi, Osaka-fu; Toshiyuki Shimada, Koubesi; Yasuaki Edahiro, Osaka-fu; Mitsurou Moriya, Naraken; Ryusuke Horibe, Koubesi; Hiroyuki Miyachi, Kyoto-fu, all of Japan

[73] Assignee: Matsushita Electric Industrial Co., Ltd., Osaka, Japan

[21] Appl. No.: 628,298

[22] Filed: Apr. 5, 1996

[30] Foreign Application Priority Data

Apr. 5, 1995 [JP] Japan .................................. 7-080086
Jan. 16, 1996 [JP] Japan .................................. 8-004547

[51] Int. Cl.[6] ............................................... G11B 7/00
[52] U.S. Cl. ............................. 369/59; 369/50; 369/54
[58] Field of Search ............................ 369/47, 48, 49, 369/50, 54, 58, 59, 60, 32, 124

[56] References Cited

U.S. PATENT DOCUMENTS

| 5,088,080 | 2/1992 | Ishibashi et al. | 369/59 X |
| 5,204,848 | 4/1993 | Cardero et al. | 369/59 X |
| 5,218,589 | 6/1993 | Aoki . | |
| 5,663,942 | 9/1997 | Ishibashi et al. | 369/59 X |

FOREIGN PATENT DOCUMENTS 61-170937  8/1986  Japan .
2-94916    4/1990  Japan .
2-221872   9/1990  Japan .

Primary Examiner—Muhammad N. Edun
Attorney, Agent, or Firm—Wenderoth, Lind & Ponack

[57] ABSTRACT

A phase error between an information signal including a reference signal that can be detected asynchronously and a synchronized signal that is synchronously produced from the information signal is detected, and a signal in response to an absolute value of the phase error is produced. Further, a defect detecting signal is produced in response to the absolute value of the phase error. Therefore, whether a pulse signal exceeding a maximum value of the pulse width of the information signal, that is, a pulse signal exceeding the pulse width of the reference signal, is detected or not, it is possible to detect that the signal reproduction enters a defect region immediately after the entry. Accordingly, a defect with noise or a track jumping can be detected rapidly. Furthermore, an information transition interval of the information signal is measured for a prescribed period of time, and the defect detecting signal is terminated in response to a measured value of a time length of the reference signal that is detected in the prescribed period of time, in other words, the passing of the signal reproduction through the defect region is detected with reference to the synchronization of the reference signal. Therefore, pseudo locking of a PLL is avoided when it is operated again, and the PLL can be accurately re-locked.

8 Claims, 11 Drawing Sheets 5,777,967

1

OPTICAL DISK DEVICE

FIELD OF THE INVENTION

The present invention relates to an optical disk device that is equipped with a means for detecting that a defect occurs in a reproduced information due to scratches on an optical disk carrier or a track jumping, that rapidly restores a synchronizing error of a data synchronizer when a defect occurs, and that significantly improves precision and reliability of a signal digitizer.

BACKGROUND OF THE INVENTION

In recent years, with an increase in information capacity and information density of an optical disk, a reduction in error rate of an optical disk drive and a security of reliability have been demanded. For example, when an information is stored in an optical disk, a primitive information is modulated and a synchronized signal is superposed on the modulated information to record the information in the optical disk. When an information is read from the optical disk and restored, initially a reproduced signal output from an optical pick-up is transformed to a pulse signal using a signal digitizing means, and the synchronized signal is separated from the pulse signal using a signal synchronizing means. With an increase in the density of the information recorded in the optical disk, the signal digitizing means and the signal synchronizing means need higher precision. Further, a reliability against various disturbances is needed.

During manufacture or use of an optical disk carrier, a disk surface or a recording face sometimes suffers scratches. When an information is reproduced from this optical disk, the information is lost or has noise in the scratched part, resulting in an increase in the error rate of the information reproduction. If the synchronized signal component is lost, the signal synchronizing means does not operate normally, and it takes time to restore itself after the defect has been passed, resulting in an information loss larger than the actual defect. Likewise, when a track jump occurs, crosstalk signals between tracks function as noise, resulting in the same problem as described above. Therefore, various methods for quickly detecting such defect with some means and stopping the operation of the signal synchronizing means during the defect have been considered.

An example of a conventional defect detector will be described hereinafter with reference to FIG. 12.

FIG. 12 is a block diagram illustrating a defect detector disclosed in Japanese Published Patent Application No. Sho. 61-170937. In FIG. 12, a reproduced information signal RF is converted to a pulse signal PRF by a signal digitizer 101. A pulse width measurement circuit 120 digital-counts the pulse width of the pulse signal PRF. A clock CCK for the counting is supplied from an asynchronous clock generator 102. In an optical disk, digitized images and sounds or computer data are subjected to code conversion and recorded as RLL (Run Length Limited) signals. That is, any information is converted into a signal sequence having a pulse width (a time interval from the leading to the trailing of the signal or from the trailing to the leading of the signal) that is equal to an integer multiple of one period of a synchronized clock signal in the synchronized state, and the pulse width is within a range from a prescribed minimum value ($T_{min}$) to a prescribed maximum value ($T_{max}$). For example, in case of EFM codes used in a CD, all signals after the conversion are composed of combinations of pulses of 3T ($T_{min}=n_{min} \times T$), 4T, 5T, ..., $n_T$, ..., 10T, and 11T ($T_{max}=n_{max} \times T$), wherein T is the length of one period of the

2 synchronized clock. The pulse width measurement means 120 outputs a pulse width n (n=integer) of a signal RF that is now being read out.

A digital comparator 103 compares the pulse width n with a pulse width $n^{-1}$ that has been read out in the previous processing. When the present pulse width n is larger, i.e., longer, than the pulse width $n^{-1}$, the pulse width n is stored in a latch register 104, and it is used as $n^{-1}$ for the next processing. When this processing is continued for a prescribed time interval, for example, a time interval measured by a frame counter (not shown), a count value $n_{max}$ of the maximum length $T_{max}$ of the RLL signal is supposed to be maintained in the latch register 104.

If an information face of the optical disk has a defect, the original RLL signal is lost in the reproduced signal RF for long hours, with the result that a pulse having a pulse width exceeding $T_{max}$ appears. In this case, a count value exceeding $n_{max}$ is maintained in the latch register 104. A digital comparator 105 compares this count value exceeding $n_{max}$ ($n^{-1}$ in the next processing) with a maximum clock count value $n_{max}$ of an ideal RLL signal. When the former exceeds the latter, the digital comparator 105 outputs a defect detection signal DFT=1.

In the construction described above, however, depending on the kind of the defect, the detection takes a lot of time or the detection is not possible at all. More specifically, when the defect is relatively large and the information is completely lost while the defect occurs, since a pulse exceeding $T_{max}$ is generated immediately after the defect has been passed, a rapid detection is possible. However, there is a defect called "interruption", for example, an abnormal formation of an information pit sequence or innumerable scratches on an information face due to that a part of the information face is rubbed with dust or the like. If the size of the scratch is smaller than a size equivalent to $T_{max}$, this defect cannot be detected by the above-described method. In a CD, $T_{max}=11T=$about 10 μm. Even when there is a scratch exceeding the size equivalent to $T_{max}$, in case of interruption, this scratch is not always detected immediately after the defect occurs. It might be detected in the middle of the defect. Further, in the state of track jumping, it isn't that no signal is present between tracks, but crosstalk signals from the tracks on both sides are mixed each other and detected. The amount of the crosstalk signals is increased as the track pitch is reduced, in other words, as the density is increased.

When the defect is not detected or the detection is delayed as described above, the signal synchronizing means is adversely affected by this defect, as well as or more than by a defect in which information is completely lost. More specifically, such defect is superposed on the RLL signal as a big noise when the RLL signal is reproduced, so that the frequency-phase relationship between the RLL signal and the synchronized clock signal produced by the signal synchronizing means is disturbed. If a PLL (Phase Lock Loop) synchronization fails as a result of the defect and the frequency of the synchronized clock signal is significantly deviated from a capture range of the PLL, the PLL cannot be re-leaded into synchronization, in other words, the PLL does not function semipermanently.

SUMMARY OF THE INVENTION

It is an object of the present invention to provide an optical disk device equipped with a defect detector that can rapidly detect an indistinct defect, such as an interruption or a track jumping, and a signal synchronizer.

It is another object of the present invention to provide an optical disk device equipped with a signal digitizer that can digitize an information signal with high accuracy and stability.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a first aspect of the present invention, an optical disk device comprises synchronizing error signal detecting means for outputting a signal in response to an absolute value of a phase error between an information signal including a reference signal that can be detected asynchronously and a synchronized signal that is synchronously produced from the information signal; decision means for producing a defect detecting signal in response to the absolute value of the phase error; means for asynchronously measuring an information transition interval of the information signal for a prescribed period of time; and means for terminating the defect detecting signal in response to a measured value of a time length of the reference signal, that is detected by the measuring means in the period of time. Therefore, whether a pulse signal exceeding a maximum value of the pulse width of the information signal, that is, a pulse signal exceeding the pulse width of the reference signal, is detected or not, it is possible to detect that the signal reproduction enters a defect region immediately after the entry. Accordingly, a defect with noise or a track jumping can be detected rapidly. Furthermore, since the passing of the signal reproduction through the defect region is detected with reference to the synchronization of the reference signal included in the information signal, pseudo locking of a PLL is avoided when it is operated again, and the PLL can be accurately re-locked.

According to a second aspect of the present invention, the above-described optical disk device further comprises phase synchronizing means that comprises phase comparing means for detecting a phase error between the information signal and the synchronized signal, and frequency variable means for controlling a phase of the synchronized signal in response to the phase error; and gate means for making the output from the phase comparing means ineffective in response to the defect detecting signal. Therefore, the phase synchronizing operation is held, i.e., halted, immediately after the signal reproduction enters a defect region, whereby an adverse influence of the defect can be reduced to the minimum.

According to a third aspect of the present invention, the above-described optical disk device further comprises frequency and phase synchronizing means that comprises phase comparing means for detecting a phase error between the information signal and the synchronized signal, frequency comparing means for detecting a frequency error of the synchronized signal on the basis of the time length of the reference signal, and frequency variable means for controlling the phase or the frequency of the synchronized signal in response to the phase error or the frequency error; and defect restoring means for making an output from the frequency comparing means effective when the defect detecting signal is produced. Therefore, frequency control is performed immediately after the signal reproduction enters a defect region, so that the frequency is not disturbed by the defect. After the defect region has been passed, phase control is rapidly performed.

According to a fourth aspect of the present invention, the above-described optical disk device further comprises signal synchronizing means comprising a phase control loop and a frequency control loop. The phase control loop comprises phase error detecting means for detecting a phase error between an information signal including a reference signal that can be detected asynchronously and a synchronized signal that is synchronously produced from the information signal, a first loop filter having at least a primary integral characteristic in a band region lower than a cut-off frequency and having a flat characteristic in a band region higher than the cut-off frequency, and frequency variable signal generating means for generating a synchronized signal having a frequency in response to a voltage output from the first loop filter, and the frequency control loop comprises frequency error detecting means for detecting a frequency error between the information signal and the synchronized signal, a second loop filter having an integral characteristic, and the frequency variable signal generating means, wherein the second loop filter and the first loop filter have an integral element for common use. Therefore, frequency control can be performed stably using the same loop filter as that used for phase control.

According to a fifth aspect of the present invention, the above-described optical disk device further comprises frequency and phase synchronizing means that comprises phase comparing means for detecting a phase error between the information signal and the synchronized signal, means for measuring a time length of the reference signal, frequency comparing means for detecting a frequency error of the synchronized signal on the basis of the time length, and frequency variable means for controlling a phase or a frequency of the synchronized signal in response to the phase error or the frequency error; and means for holding an output from the means for measuring the time length of the reference signal when the defect detecting signal is produced. Therefore, it is avoided that noise in a defect is detected as a reference signal by mistake, whereby frequency control during the defect is performed with high stability.

According to a sixth aspect of the present invention, the above-described optical disk device further comprises means for digitizing the information signal with an appropriate threshold; first feedback means for deciding the threshold by performing a negative feedback of a signal in response to a difference in appearance frequencies in a unit time interval between a first value and a second value of the digitized signal; second feedback means for substantially forming a positive feedback closed circuit by applying, to the first feedback means, a signal in response to a difference in appearance frequencies in a unit time interval between a first value and a second value of a reference signal that is obtained by serially latching the digitized signal with a synchronized clock signal that is produced synchronously with the digitized signal; and feedback restricting means for restricting the feedback of the second feedback means in response to the defect detecting signal. In this circuit structure, usually the second feedback means functions as a control target of the first feedback means and prevents a drift of the threshold due to a pattern of the information signal, whereby the information signal is digitized with high accuracy. When a defect occurs, the defect is rapidly detected and the operation of the second feedback means is restricted, whereby the circuit system is prevented to be unstable.

DETAILED DESCRIPTION OF THE PREFERRED EMBODIMENTS

Preferred embodiments of the present invention will be described hereinafter with reference to the drawings.

|EMBODIMENT 1|

Figure 1:
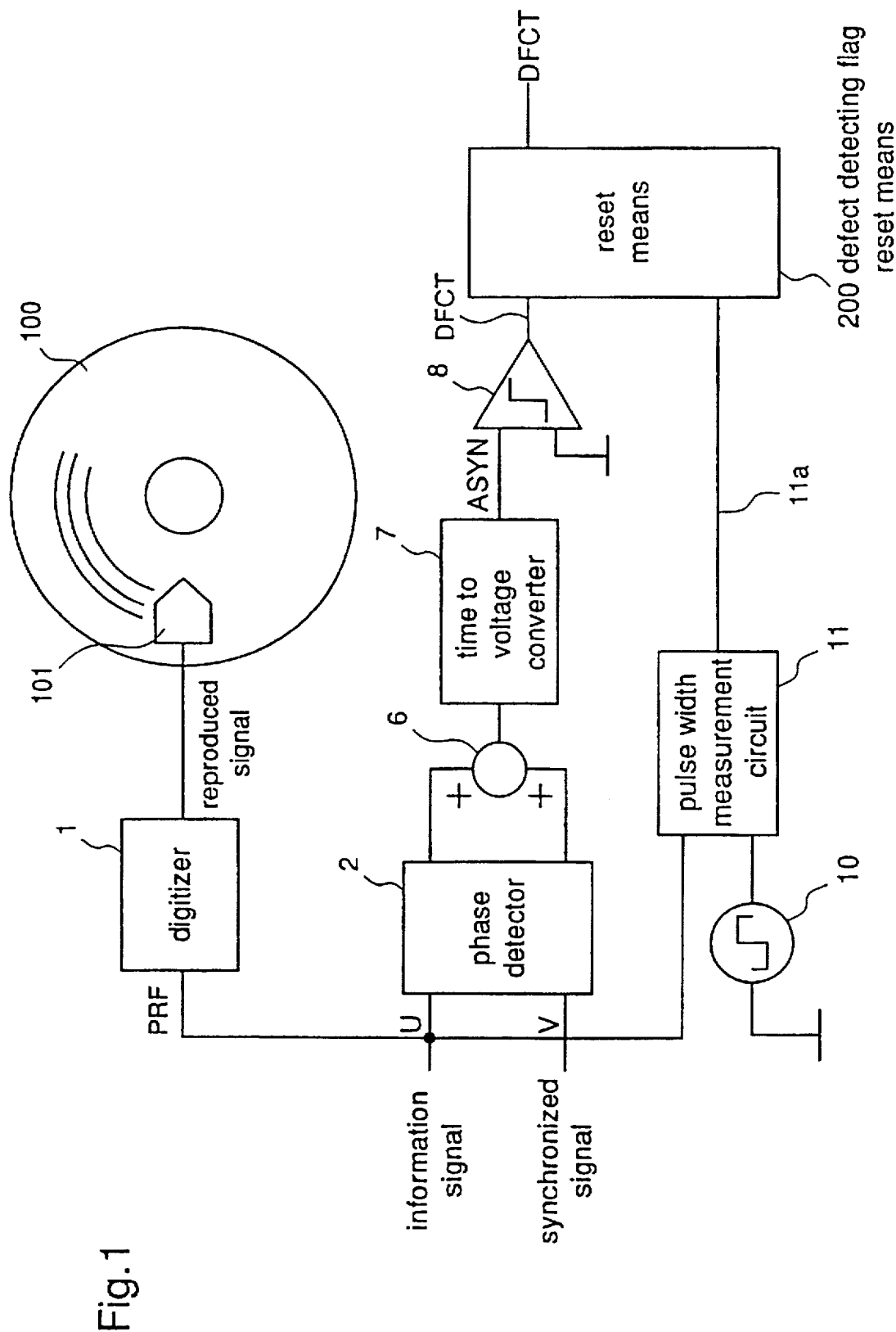
FIG. 1 is a block diagram illustrating a defect detector included in an optical disk device in accordance with a first embodiment of the present invention.

FIG. 1 is a block diagram illustrating an optical disk device including a defect detector in accordance with a first embodiment of the present invention. In FIG. 1, reference numeral 2 designates a phase detector for generating a pulse in response to a phase error between an information signal PRF that is reproduced from an optical disk carrier 100 by a pick-up 101 and transmitted through a signal digitizer 1 and a synchronized clock signal CK. Reference numeral 6 designates an adder, and numeral 7 designates a time to voltage converter. The phase detector 2, the adder 6, and the time to voltage converter 7 constitute a synchronizing error detecting means that detects an absolute value of the phase error, i.e., a synchronizing error, and outputs a synchronizing error signal ASYN. Reference numeral 8 designates a voltage comparator (decision means) that compares the detected synchronizing error signal ASYN with a threshold voltage VTH and produces a defect detecting flag signal DFCT. Reference numeral 11 designates a pulse width measurement circuit (measuring means) that measures a pulse width of a reference signal REF included in the information signal U using a clock generated by an asynchronous clock signal generator 10. Reference numeral 200 designates a defect detecting flag reset means that outputs the defect detecting flag signal DFCT from the voltage comparator 8 as it is or resets the defect detecting flag signal DFCT on the basis of a result 11a of the measurement by the pulse width measurement circuit 11.

A description is given of the operation of the optical disk device including the defect detector according to the first embodiment with reference to FIGS. 1, 2, 3, 4, and 6.

First of all, an information mark group in which a maximum length and a minimum length are specified is recorded in the optical disk carrier 100. In this first embodiment of the invention, a mark having the maximum length is defined as a reference mark, and a signal obtained by reproducing the reference mark is a reference signal. In the circuit shown in FIG. 1, an information pulse signal PRF that is digitized by the digitizer 1 is applied to an input terminal U of the phase detector 2, and a synchronized clock signal CK is applied to an input terminal V of the phase detector 2. Receiving the signals PRF and CK, the phase detector 2 outputs pulse signals UP and DN having pulse widths equivalent to a phase lead and a phase lag of a leading or trailing edge of the information signal PRF (information transition) from a leading edge of the synchronized clock signal CK, respectively. When the synchronized clock signal CK is generated in the phase locked state (the left half of FIG. 6), the pulse widths of the pulse signals UP and DN are almost 0. To be exact, the pulse signals UP and DN have a specified phase width which will be later described in more detail. When the signal reproduction rushes in a defect region DF as shown in the right half of FIG. 6, since noise is superposed on the information signal PRF, the relationship between the information signal PRF and the synchronized clock signal CK that has been produced before the signal reproduction enters the defect region DF is significantly disturbed. In this case, a random phase lag or phase lead occurs between the signals, so that the pulse widths of the pulse signals UP and DN are not 0 any more. Therefore, as shown in FIG. 6, pulse signals having pulse widths that vary at random appear at the phase outputs UP and DN.

Figure 6:
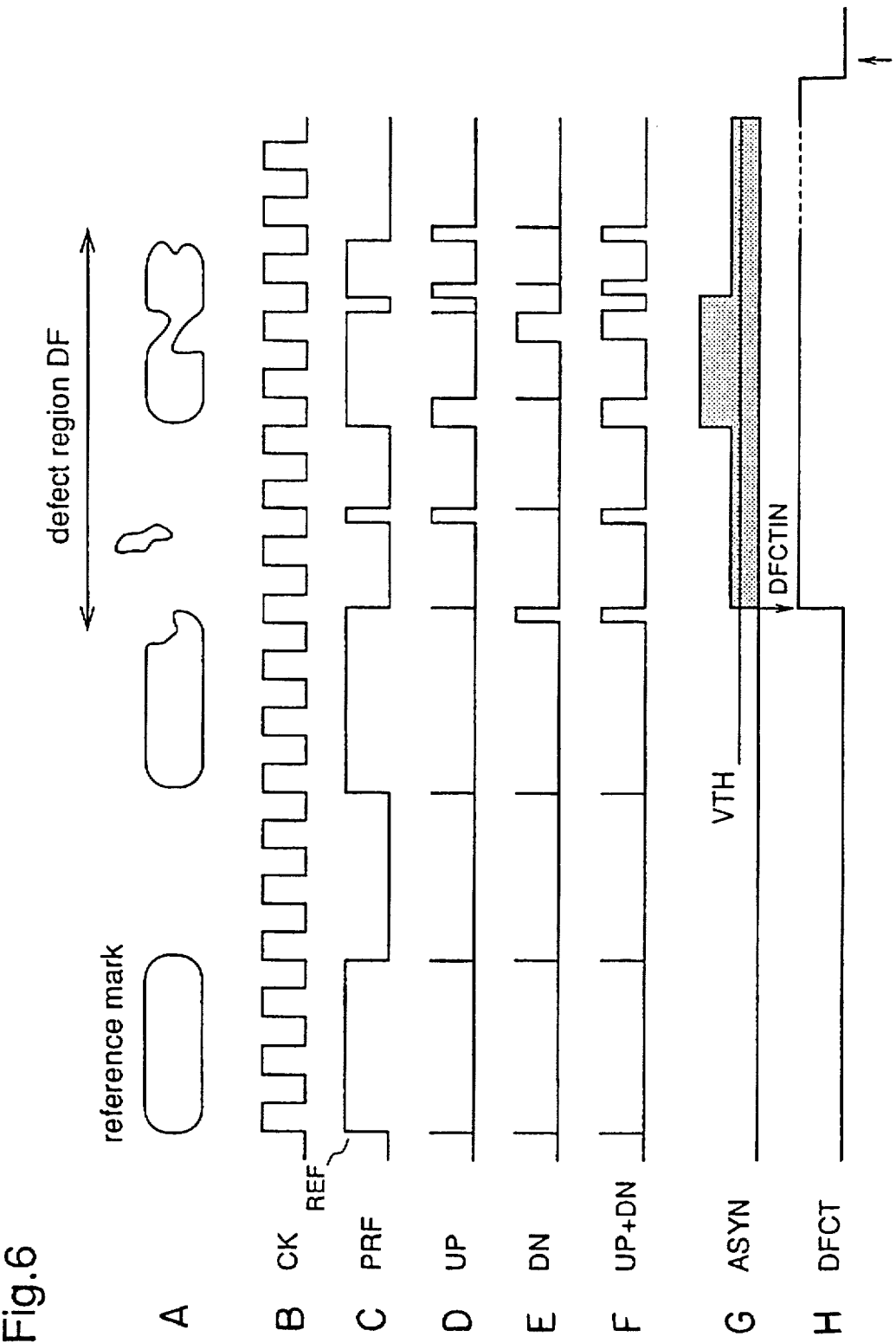
FIG. 6 is a timing chart for explaining the operation according to the second embodiment of the invention.

These pulse signals UP and DN both having pulse widths that vary at random are added up by the adder 6, and the sum is converted to a voltage by the time to voltage converter 7, resulting in a signal ASYN having an amplitude in response to the pulse widths of the signals UP and DN, as shown in FIG. 6. This amplitude depends on the degree of the defect. More specifically, it depends on the magnitude of noise caused by the defect. The voltage comparator 8 compares the signal ASYN with an appropriate threshold voltage VTH and generates a flag signal DFCT when the signal ASYN exceeds the threshold voltage VTH.

Figure 2:
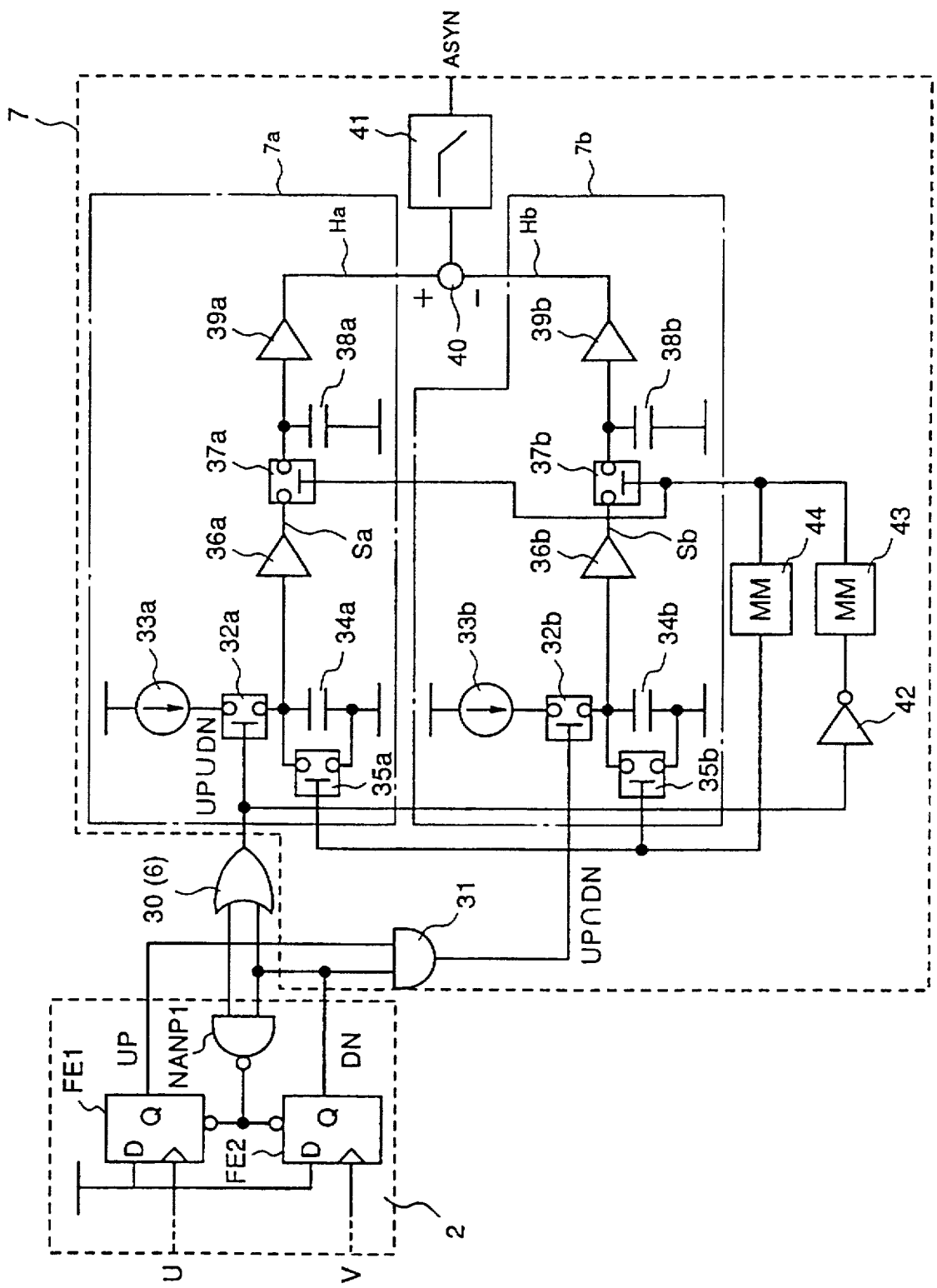
FIG. 2 is a diagram illustrating a synchronizing error detecting section of the defect detector in accordance with the first embodiment of the invention.

Specific structures of the phase detector 2 and the time to voltage converter 7 are shown in FIG. 2.

Figure 3:
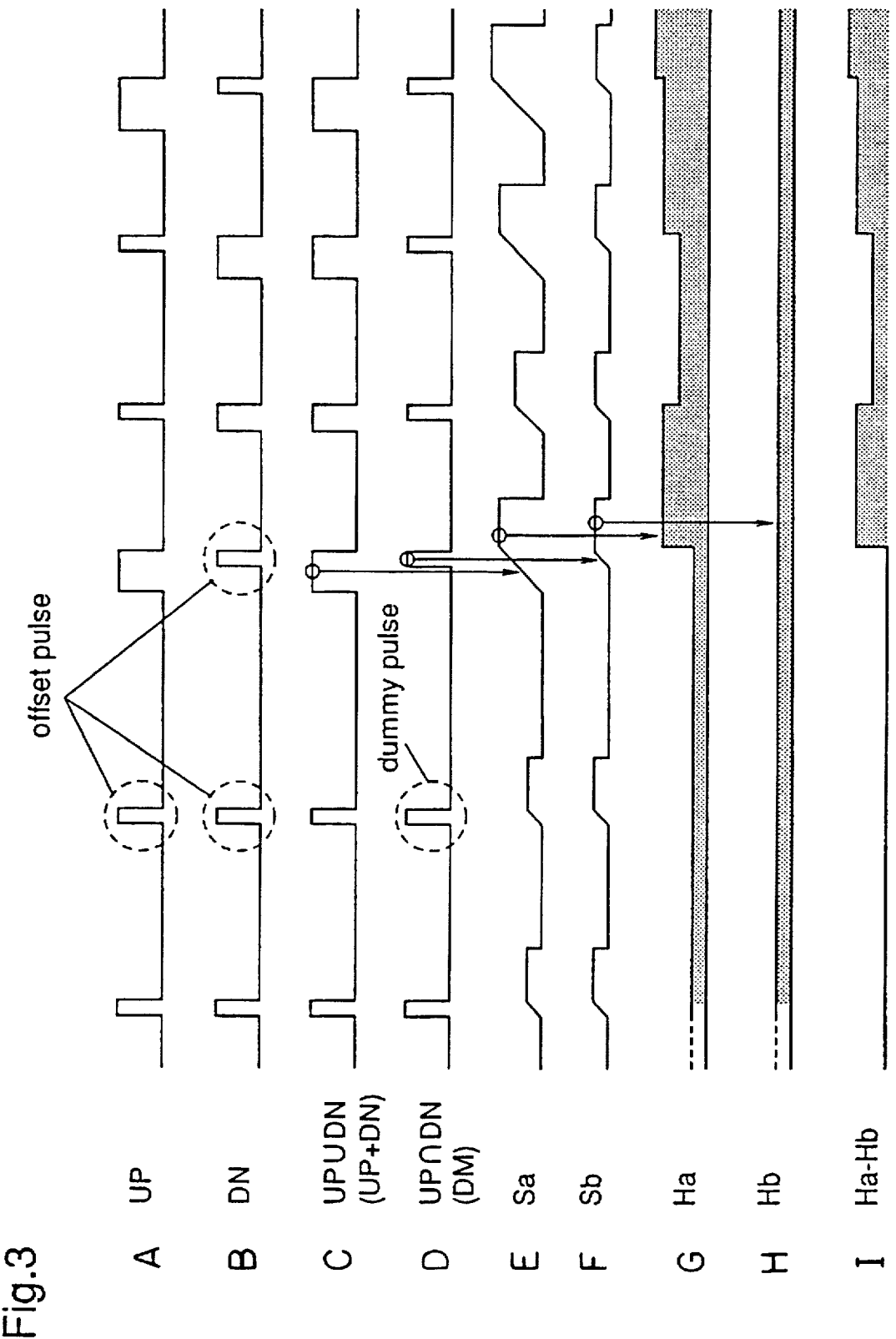
FIG. 3 is a timing chart for explaining the operation according to the first embodiment of the invention.

The phase detector 2 is generally used in a PLL (Phase Lock Loop), i.e., a phase synchronization circuit. The phase detector 2 comprises two flip-flops FF1 and FF2 that are triggered by leading of signals input to the input terminals U and V, respectively, and a NAND gate NAND1 that resets the flip-flops with a logical product of output signals from the flip-flops. The output signals from the flip-flops FF1 and FF2 are UP and DN. When the signals UP and DN are output from the phase detector 2, offset pulse signals OFP are produced due to a delay in the phase detector 2. If there is no delay in the phase detector 2, when signals of the same phase are input to the input terminals U and V, the phase detector 2 should output signals UP and DN having a pulse width of 0 (infinitely narrow). In the practical operation, however, offset pulse signals having a pulse width equivalent to the delay of the flip-flops FF1 and FF2 and the NAND gate NAND1 constituting the phase detector 2 are output, as shown in FIG. 3. When the differential outputs from the phase detector 2 are used in a PLL as described later, since a difference signal of the outputs UP and DN is used, the offset components are canceled each other and offer no problem. However, when a synchronizing error signal ASYN is detected from the sum of the pulse widths of the output signals UP and DN (an absolute value of the phase error) as in this first embodiment of the invention, the offset components are unfavorably added to each other. If the offset components are varied due to a temperature drift or the like, the variation causes a detection error when a defect detecting flag signal DFCT is produced by comparing the synchronizing error signal ASYN with a threshold voltage VTH. In order to avoid this error, in this first embodiment of the invention, a dummy pulse DM (UP ∩ DN) having a width equivalent to the width of the offset pulse is produced at every input of the information reproduced signal PRF (refer to FIG. 3), whereby the offset components are eliminated.

More specifically, in FIG. 2, an OR gate 30 produces an added signal UP ∪ DN used for the synchronizing error detection, and the OR gate 30 corresponds to the adder 6 shown in FIG. 1. On the other hand, the dummy pulse (counter offset pulse) DM (UP ∩ DN) is extracted by passing the phase lead and lag pulses UP and DN output from the phase detector 2 through the AND gate 31, as shown in FIG. 3.

Further, in FIG. 2, the time to voltage converter 7 comprises a first time to voltage conversion section 7a that performs time to voltage conversion of the added pulse signal UP ∪ DN, that is, the synchronizing error component ASYN, and a second time to voltage conversion section 7b that performs time to voltage conversion of the logic product pulse signal UP ∩ DN, that is, the dummy pulse component DM for eliminating the offset. The first time to voltage conversion section 7a comprises switches 32a, 35a, and 37a, a current source 33a, capacitors 34a and 38a, and buffer amplifiers 36a and 39a. The second time to voltage conversion section 7b comprises switches 32b, 35b, and 37b, a current source 33b, capacitors 34b and 38b, and buffer amplifiers 36b and 39b.

The operation of the time to voltage converter 7 will be described with respect to the first time to voltage conversion section 7a. The switch 32a supplies a constant current to the capacitor 34a for a time interval equivalent to the pulse width, whereby a voltage Sa having an amplitude in proportion to the pulse width is produced between opposite ends of the capacitor 34a. The switch 37a and the capacitor 38a samples and holds the voltage Sa to produce a signal Ha. The operation of the second time to voltage conversion section 7b is similar to the above-mentioned operation. The sampling and holding process is performed for a prescribed time interval from the trailing of the added pulse signal UP ∪ DN, and the timing is decided by an inverter 42 and a one-shot vibrator 43. Electric charges stored in the capacitors 34a and 34b are discharged when the sampling and holding process is ended, and the timing is decided by a one-shot vibrator 44. After the time to voltage conversion, both the signals Ha and Hb pass through a subtracter 40, whereby the offset component DM is eliminated from the synchronizing error component. A low-pass filter 41 eliminates a high-frequency variation component from the synchronizing error signal ASYN to avoid an oversensitive holding operation of the signal synchronizer.

Figure 4:
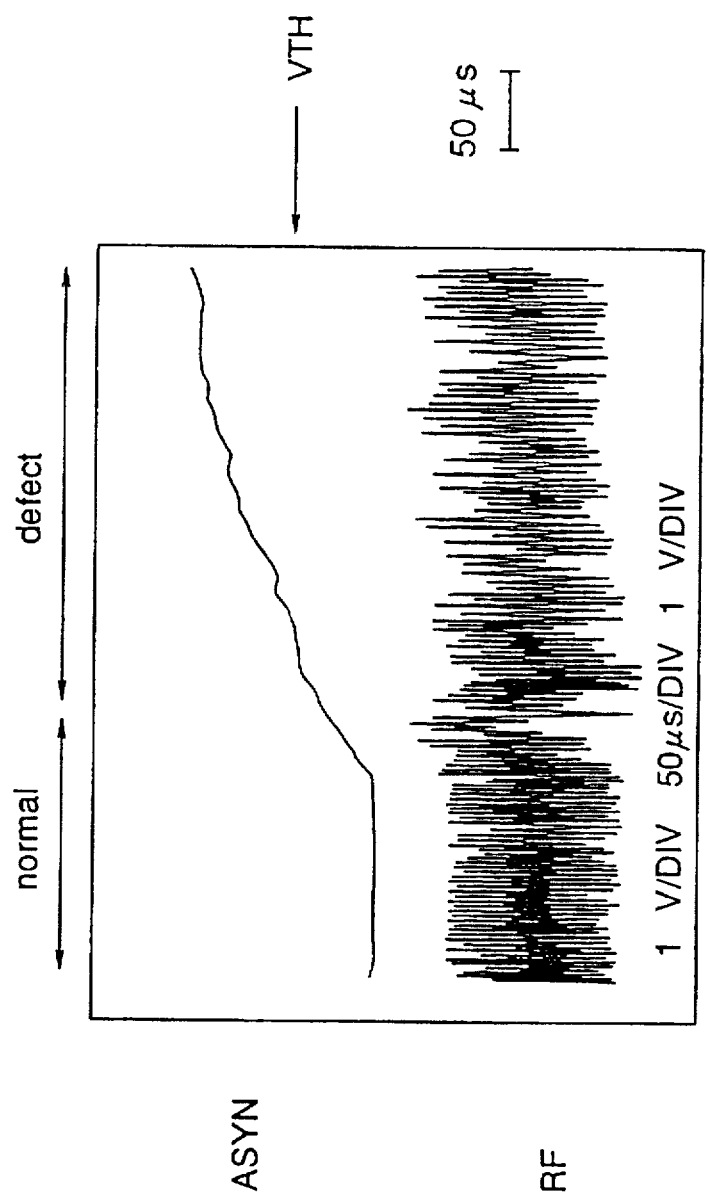
FIG. 4 is a diagram illustrating a result of an experiment employing the defect detector according to the first embodiment of the invention.

FIG. 4 shows a result of an experiment in which an interruption defect formed in a test CD is detected using the circuit shown in FIG. 2. As can be seen from FIG. 4, the synchronizing error signal ASYN increases as soon as the signal reproduction enters the defect region DF. By detecting the increase in the signal ASYN with the threshold level VTH, a defect detecting signal DFCT can be produced in a short time interval as 50–100 μs.

According to the first embodiment of the present invention, a phase error between an information signal PRF including a reference signal REF that can be detected asynchronously and a synchronized signal CK that is synchronously produced from the information signal is detected, and a signal ASYN is produced in response to an absolute value of the phase error. Further, a defect detecting signal DFCT is produced in response to the absolute value of the phase error. Therefore, whether a pulse signal exceeding a maximum value $T_{max}$ of the pulse width of the information signal, that is, a pulse signal exceeding the pulse width of the reference signal, is detected or not, it is possible to detect that the signal reproduction enters a defect region DF immediately after the entry. Accordingly, a defect with noise or a track jumping can be detected rapidly. Further, an information transition interval of the information signal PRF is measured for a prescribed period of time, and the defect detecting signal DFCT is terminated in response to a measured value of a time length of the reference signal REF that is detected in the prescribed period of time, in other words, the passing of the signal reproduction through the defect region DF is detected with reference to the synchronization of the reference signal. Therefore, pseudo locking of the PLL is avoided when it is operated again, and the PLL can be accurately re-locked.

The operation of the pulse width measurement circuit 11 and the specific structure and function of the defect reset means 200 will be described hereinafter according to other embodiments of the present invention wherein these circuits are actually applied to a signal synchronizing means or a signal digitizing means.

[EMBODIMENT 2]

Figure 5:
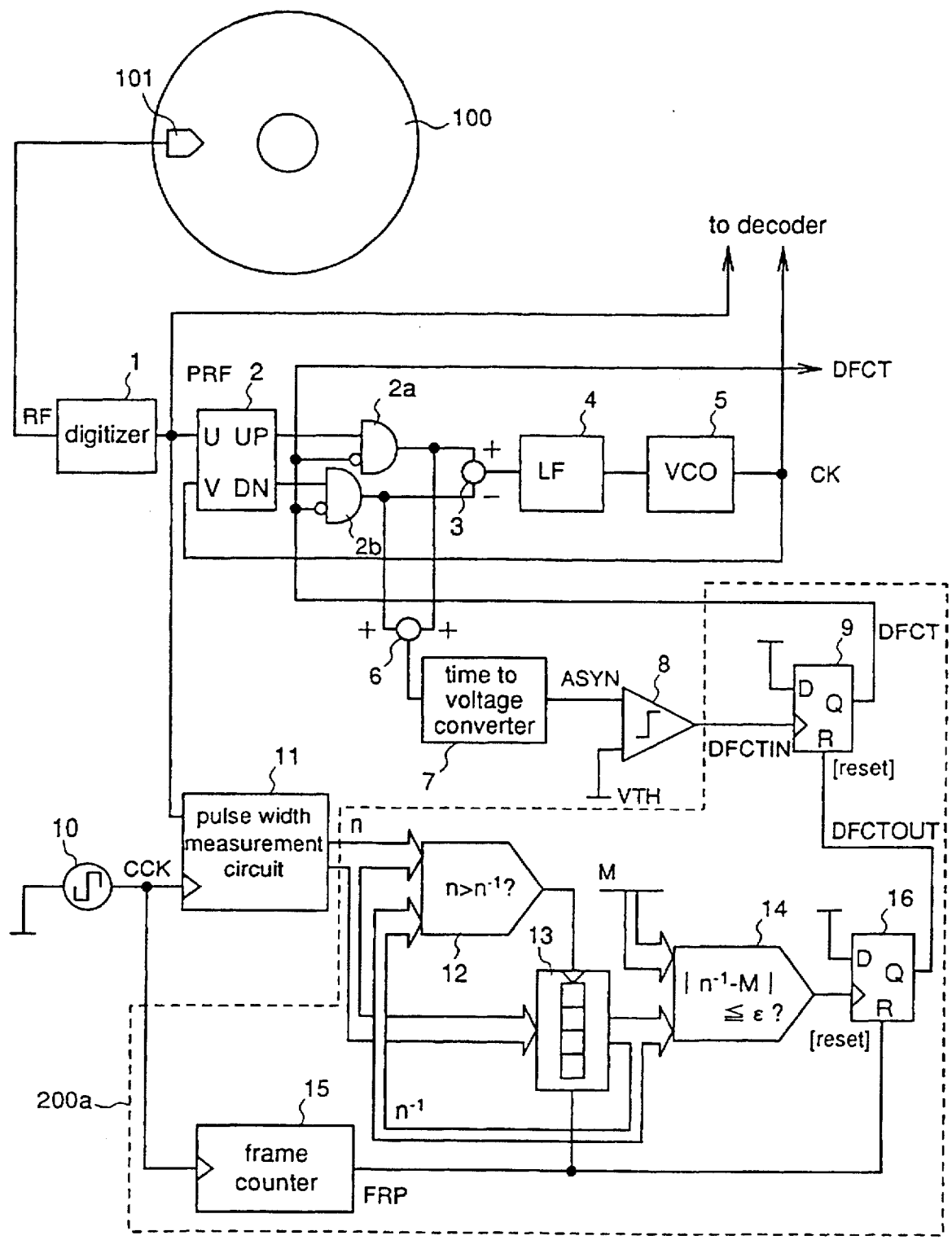
FIG. 5 is a block diagram illustrating a defect detector and a signal synchronizer utilizing the defect detector in accordance with a second embodiment of the present invention.

FIG. 5 is a block diagram illustrating an optical disk device including a defect detector and a signal synchronizer utilizing the defect detector, according to a second embodiment of the present invention. In FIG. 5, reference numeral 1 designates a digitizer that produces an information signal PRF by pulsing a reproduced signal RF that is read from an optical disk carrier 100 by an optical pick-up 101. A phase detector 2, a subtracter 3, a loop filter 4, a voltage-controlled oscillator (VCO) 5 (frequency-variable signal generating means), and gates 2a and 2b constitute a PLL synchronous circuit (phase synchronizing means) that produces a synchronized clock signal CK that is synchronized with the pulse signal PRF. The pulse signal PRF and the synchronized clock signal CK are applied to a decoder and transformed to video signals, audio signals, or other information signals.

The phase detector 2, the adder 6, the time to voltage converter 7, the voltage comparator 8, the flip-flop 9, the asynchronous clock signal generator 10, and the pulse width measurement circuit 11 operate in the same manner as already described with respect to the first embodiment of the invention. A flip-flop 9 produces a defect detecting flag signal DFCT. Further, digital comparators 12 and 14, a latch register 13, a frame counter 15, and a flip-flop 16 constitute a defect reset means 200a which compares a measured value of a maximum or minimum information transition interval of the information signal with a defined value in a prescribed period of time and resets the defect detecting flag signal DFCT when the measured value coincides with the defined value within a prescribed error range. Also in this second embodiment of the invention, an information mark group in which a maximum length and a minimum length are specified is recorded in the optical disk carrier 100. In addition, a mark having the maximum length is defined as a reference mark, and a signal obtained by reproducing the reference mark is a reference signal.

The operation of the optical disk device including the defect detector and the signal synchronizer according to the second embodiment of the invention will be described with reference to FIGS. 5 and 6.

In the circuit shown in FIG. 5, when an information signal PRF and a synchronized clock signal CK are input to input terminals U and V of the phase detector 2, respectively, first and second pulse signals having pulse widths equivalent to a phase lead and a phase lag of a leading or trailing edge of the pulse signal PRF from a leading edge of the synchronized clock signal CK are output as UP and DN, respectively. A difference signal UP-DN is smoothed by the loop filter 4 and applied to the VCO 5 as a phase difference signal, and a synchronized clock signal CK produced by the VCO 5 is fed back to the phase detector 2, whereby the phases of the first and second pulse signals UP and DN are synchronized. In other words, a clock component CK can be synchronously extracted from the reproduced signal RF. An average of the phase difference signal UP-DN is 0.

As described in the first embodiment of the invention, the phase lead signal UP and the phase lag signal DN are transformed to a defect detecting flag signal DFCT through the adder 6, the time to voltage converter 7, and the voltage comparator 8. In this second embodiment, however, an output from the voltage comparator 8 is a defect-in signal DFCTIN, and the flip-flop 9 is triggered at the leading of the defect-in signal DFCTIN to produce a defect detecting signal DFCT from the flip-flop 9.

When a defect is detected and a defect detecting flag signal DFCT is produced, the signal synchronizer (PLL) closes the gates 2a and 2b so that an output from the phase detector 2 is not supplied to the loop filter 4. Thereby, the oscillating frequency of the VCO 5 is maintained, and unwanted disturbance of the synchronized clock signal CK due to noise caused by the defect is avoided. However, when the PLL operation is once stopped as described above, phase synchronization is not performed even after the defect region DF has been passed, and the output from the time to voltage converter 7 remains as it exceeds the threshold level VTH. Therefore, a defect flag reset means 200a for detecting that the signal reproduction has passed the defect region DF and enters a region where a signal synchronizing process can be performed is required.

Hereinafter, the defect flag reset means 200a will be described in more detail.

The pulse width measurement circuit 11 serially digital-counts the pulse width of the information signal PRF. A clock CCK for the counting is supplied from the asynchronous clock signal generator 10, and this clock CCK is asynchronous with respect to the synchronized clock signal CK. However, the period of the clock CCK is approximated to a period T, or 1/n of the period T (n: integer, of a reference clock REF included in the information signal PRF when a reference mark is detected (refer to FIG. 6). Therefore, the pulse width measurement circuit 11 outputs a digital value n that represents how many times the pulse width of the measured signal, i.e., the information signal PRF, is larger than the period T. The comparator 12 compares the pulse width n with a pulse width $n^{-1}$ that has been obtained in the previous processing. When the pulse width n is larger, i.e., longer, than the pulse width $n^{-1}$, the present pulse width n is maintained in the latch register 13 and used as $n^{-1}$ in the next processing. When this processing has been continued for a while, a measured value having a maximum pulse width $T_{max}$ among the pulse signals that have been reproduced is maintained in the latch register 13.

In the above-described processing, when a laser beam has passed the defect region DF and entered the normal information region, according to the RLL codec rule, the maximum pulse width should coincide with $T_{max}$ (=M×T). The digital comparator 14 detects this coincidence. Since there are a few errors in the practical measurement, when $M-\epsilon \leq n^{-1} \leq M+\epsilon$, a flag (L→H) is risen and secured by the flip-flop 16 to produce a defect reset signal DFCTOUT, and the defect reset signal DFCTOUT is applied to a reset input of the flip-flop 9 to reset the defect detecting flag signal DFCT. As a result, the gates 2a and 2b are opened and the PLL starts the operation again. In addition, $\epsilon$ is a margin of the detection error. When M=11, $\epsilon$ is about 1~2.

The frame counter 15 circularly digital-counts the count clock CCK and outputs a frame pulse signal FRP at a prescribed period. The frame counter 15 directs the start and the termination of the above-described operation. More specifically, the flag signal FLG=1 applied to the flip-flop 16 is defined by the leading of the frame pulse FRP and then it is output as a defect terminating signal DFCTOUT=1. Simultaneously, the latch register 13 is reset and starts the operation of detecting a maximum pulse width in the next cycle. The period of the frame counter 15 must be sufficiently long to detect $T_{max}$ surely within the period. However, if it is excessively long, the timing to output the defect terminating signal DFCTOUT=1 is delayed by the excess length, so that it must not be longer than required. In a CD format, a mark of $T_{max}$=11T is used as a re-sync mark, and a re-sync area is provided at every 40 bytes. Therefore, when the frame pulse signal FRP is output at a time interval about twice as long as the re-sync period, i.e., about 80 bytes, at least one mark of $T_{max}$ is detected.

According to the second embodiment of the present invention, an optical disk device comprises a synchronizing error signal detecting means for outputting a signal ASYN in response to an absolute value of a phase error between an information signal PRF and a synchronized signal CK, a decision means 9 for producing a defect detecting signal in response to the absolute value of the phase error, a phase comparing means 2 for detecting a phase error between the information signal and the synchronized signal, a frequency variable means 5 for controlling the phase of the synchronized signal in response to the phase error, gate means 2a and 2b for making an output signal from the phase comparing means 2 ineffective in response to the defect detecting signal, and means 200a for comparing a measured value of a maximum or minimum information transition interval of the information signal with a reference value that is specified in advance and resetting the defect detecting signal DFCT when these values coincide each other. Therefore, a defect is rapidly detected by the synchronizing error detecting means to hold the PLL circuit. Further, after the defect has been passed, the PLL operation can be started again by resetting the defect flag signal to open the gates 2a and 2b.

In the first and second embodiments of the invention, the phase detector 2 has two output signals, i.e., a phase lead signal and a phase lag signal, and a synchronizing error is detected from a logical sum of these signals. However, the function of the phase detector 2 is not restricted thereto. As described above, the phase detector is, essentially, an apparatus for producing phase comparison signals that vary in positive and negative directions with 0 as the center of the variation, from the differential outputs, i.e., the phase lead output and the phase lag output, in response to the phase lead and the phase lag. So, the addition of these output signals according to the present invention is, in other words, a detection of an absolute value of the phase error. Therefore, a phase detector that directly outputs signals corresponding to the differential outputs, more specifically, a phase detector that outputs a phase error with voltage values or current values that are positive or negative with a reference voltage or current as the center, may be employed. In this case, however, it is necessary to consider an absolute value calculation as a substitute for the adding operation, for example, a full wave rectification applied to the variation in the output voltage (current) from the phase detector with respect to the reference voltage (current).

[EMBODIMENT 3]

Figure 7:
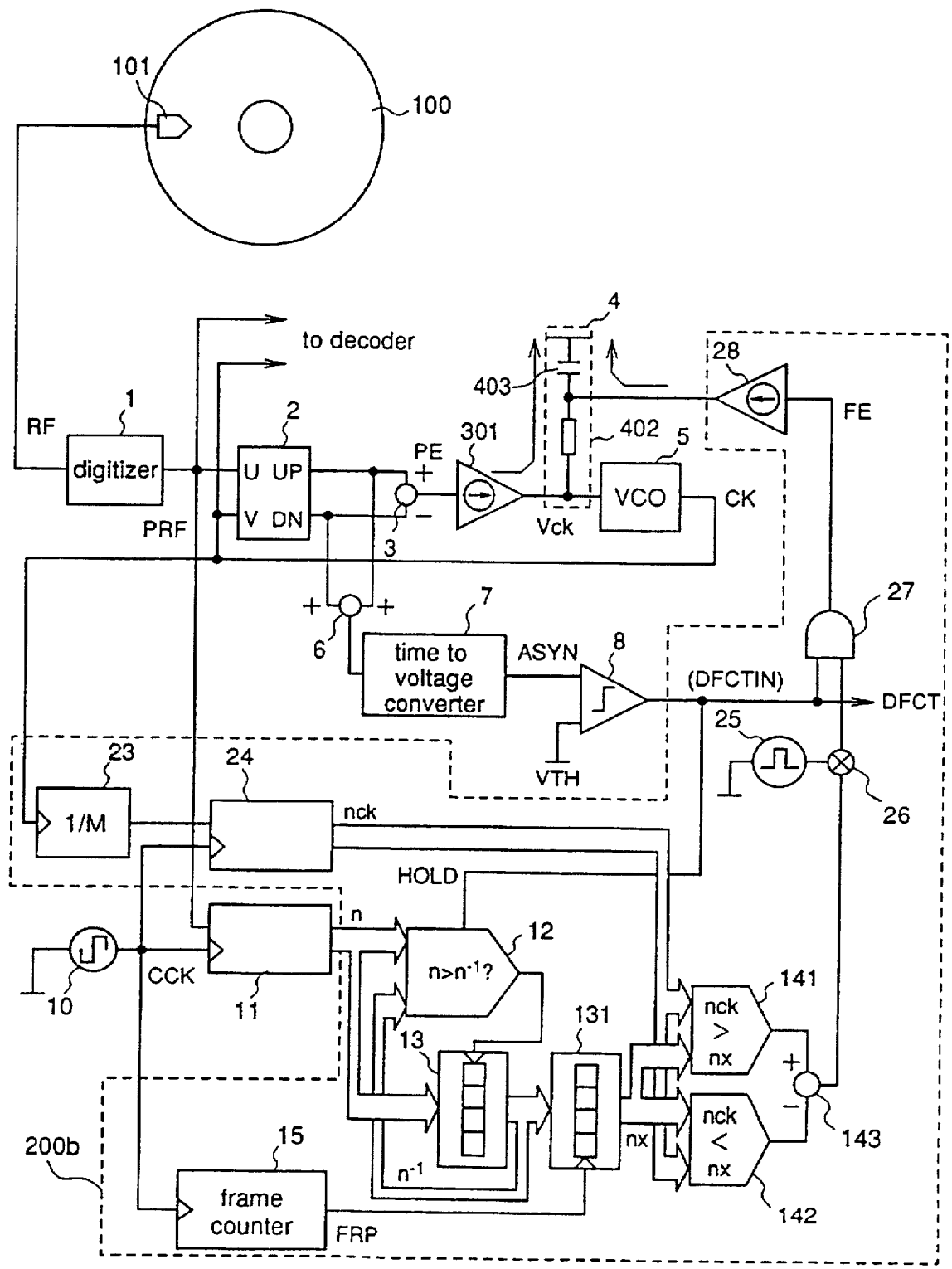
FIG. 7 is a block diagram illustrating a defect detector and a signal synchronizer utilizing the defect detector in accordance with a third embodiment of the present invention.

A description is given of a third embodiment of the present invention. FIG. 7 is a block diagram illustrating an optical disk device including a defect detector and a signal synchronizer in accordance with a third embodiment of the present invention. In FIG. 7, an optical disk carrier 100, a pick-up 101, a digitizer 1, a phase detector 2, a subtracter 3, a VCO 5, an adder 6, a time to voltage converter 7, a voltage comparator 8, an asynchronous clock generator 10, a pulse width measurement circuit 11, a digital comparator 12, a latch register 13, a frame counter 15, a synchronizing error detecting means, and a PLL synchronous circuit (phase synchronizing means) operate in the same manner as already described with respect to FIG. 5. Also in this third embodiment of the invention, an information mark group in which a maximum length and a minimum length are specified is recorded in the optical disk carrier 100. In addition, a mark having the maximum length is defined as a reference mark, and a signal obtained by reproducing the reference mark is a reference signal.

In the circuit shown in FIG. 7, a pulse width measurement circuit 11, a digital comparator 12, latch registers 13 and 131, a frame counter 15, a divider 23, a pulse width measurement circuit 24, digital comparators 141 and 142, a subtracter 143, a pulse generator 25, a modulator 26, a gate 27, and a charge pump 28 constitute a defect restoring means 200b that makes outputs from the frequency comparing means (141 to 143) effective when a defect detecting signal DFCT is produced.

The defect detection circuit according to this third embodiment is characterized by that an output from the voltage comparator 8 (DFCTIN in FIG. 5) is applied, through no flip-flop (9 in FIG. 5), directly to the PLL as a defect detecting flag signal DFCT. In the second embodiment of the invention shown in FIG. 5, since the PLL is held (halted) using the defect detecting flag signal DFCT, the synchronizing error signal DFCTIN cannot reset itself, so that the defect reset flag signal DFCTOUT is needed. In this third embodiment, however, a frequency error signal FE output from the frequency comparing means (141 to 143) is added to the loop filter 4 when the defect detecting flag DFCT is produced, whereby frequency control is carried out, superposed on phase control. Therefore, the frequency is not significantly deviated even where a defect occurs. The defect detecting flag DFCT rapidly resets itself when the defect region DF has been passed and the frequency error has disappeared, i.e., when frequency-up and frequency-down regions shown in FIG. 8 has been passed, and the PLL circuit is restored to the normal operation, i.e., phase control operation.

Figure 8:
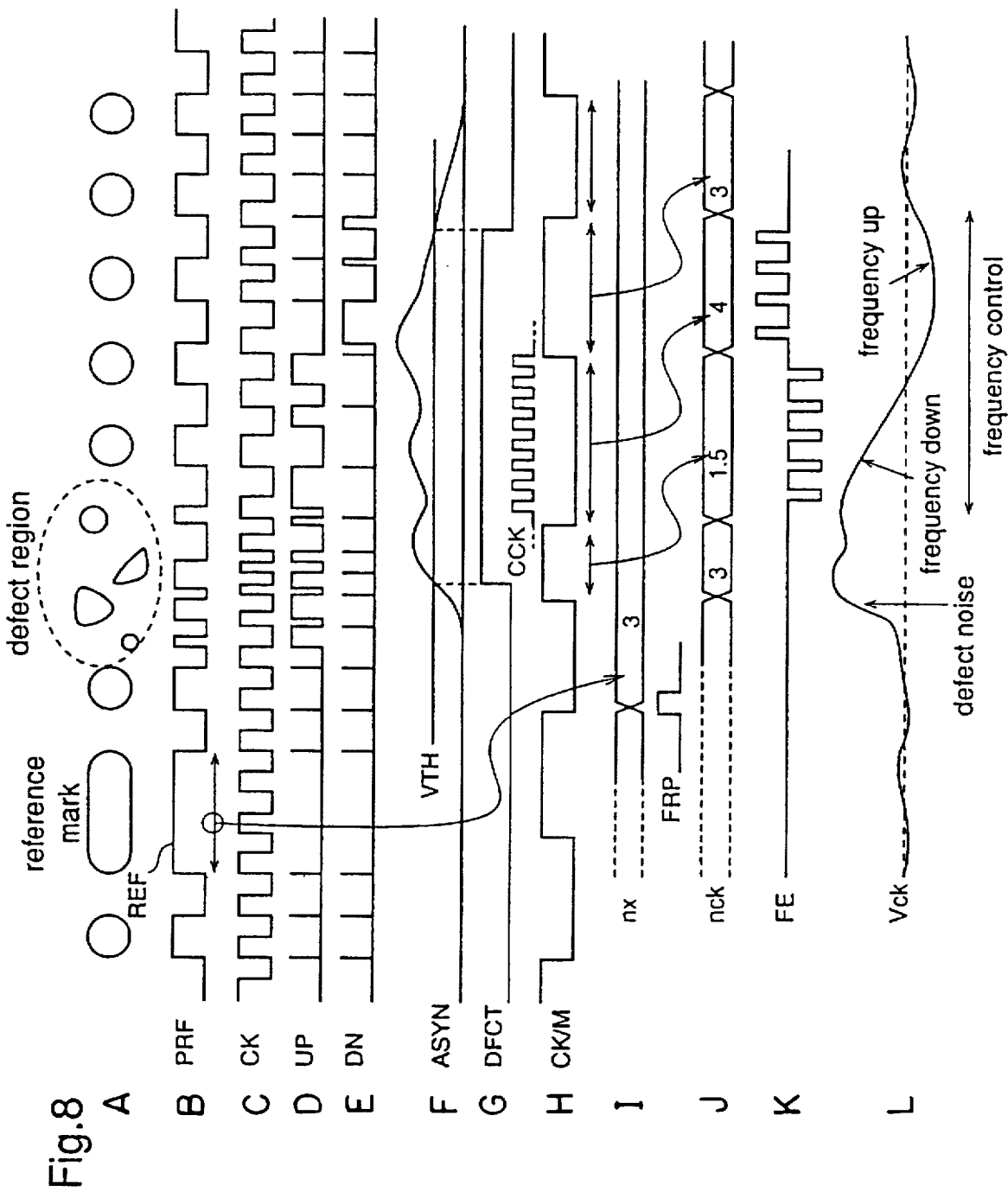
FIG. 8 is a timing chart for explaining the operation according to the third embodiment of the invention.

The operation will be described in more detail. Initially, a sequential detection for a maximum value is performed by the asynchronous clock generator 10, the pulse width measurement circuit 11, the digital comparator 12, the latch register 13, and the frame counter 15, whereby a length $n_x$ of a reference signal having a maximum pulse length, which is measured in an asynchronous measurement, is digitally output from the latch register 131 in a prescribed period of time. On the other hand, the synchronized clock CK is subjected to M division by the divider 23. M represents a specified length of a reference signal that is obtained by reproducing a reference mark, and M corresponds to $T_{max}$. More specifically, when the information signal PRF and the synchronized clock signal CK are phase-synchronized each other, the pulse length of the reference signal is M times as long as the period of the synchronized clock CK. The pulse width measurement circuit 24 operates in the same manner as the pulse width measurement circuit 11, and it counts the M-divided signal with the asynchronous clock CCK and outputs the signal as a digital value nck. When there is no frequency error between the information reproduced signal RF and the reproduced signal CK of the PLL, the length of the reference signal included in the information signal is equivalent to the pulse width of the signal that is produced by the M division of the synchronized clock CK. Therefore, the digital count values nck and nx have the relationship of nck=nx. When the phase detector 2 is disturbed by a defect, noise is superposed on the VCO input voltage Vck. As a result, a frequency error is produced, and one of the digital count values nck and nx becomes larger or smaller than the other. This is detected by the digital comparators 141 and 142, and the frequency error is output from the subtracter 143 as a signal having positive and negative voltages. This signal is subjected to pulse modulation by the pulse generator 25 and the modulator 26 and fed back to the PLL circuit as a frequency error signal FE. FIG. 8 is a timing chart showing the above-described processing.

Receiving the frequency error signal FE, the PLL circuit performs frequency control. In this third embodiment of the invention, the loop filter 4 comprises a resistor 402 and a capacitor 403 which are connected in series. A charge pump 301 is connected to the output terminal of the subtracter 3, and the phase detector 2 substantially supplies an output current in response to the phase error PE to the loop filter 4. The phase control operation of the PLL circuit is identical to the operation already described with respect to the first embodiment of the invention. On the other hand, the frequency error signal FE is also converted to a current by the charge pump 28 and supplied to the capacitor 403 that is included in the loop filter 4.

The reason why the phase error signal PE and the frequency error signal FE are supplied to the loop filter 4 from different entrances will be described later. Here, the operation of the frequency control system will be described using the flowchart of FIG. 8.

In this description, it is supposed that M=3, in other words, the reference signal length is 3 times as long as the synchronized clock. Further, in order to improve the measuring precision, the frequency of the asynchronous clock CCK is about two times as high as the frequency of the synchronized clock CK in the synchronization.

As soon as the signal reproduction enters a defect region, the frequency of the clock CK temporarily increases due to noise, and nck (M-divided signal width: in the figure, the measured length=1.5) is smaller than nx (reference signal width: in the figure, the measured length=3), so that the frequency error signal FE becomes a pulse sequence in the negative direction. Thereby, the capacitor 403 is discharged, and the voltage Vck applied to the VCO 5 is decreased, resulting in a reduction in the frequency of the synchronized clock signal CK that is produced by the VCO 5. Then, the width of the M-divided signal is increased, so that the count value nck is increased (in the figure, the measured length 1.5→4). At this time, the frequency error signal FE becomes a pulse sequence in the negative direction and charges the capacitor 403, whereby the voltage Vck applied to the VCO 5 is increased. As a result, it is determined that nck (the measured length=3)=nx (the measured length=3), in other words, the oscillating frequency of the VCO 5 is 1/M of the reference signal width. Here, the measured length nx is a maximum mark length that is obtained by serially renewing the output n from the pulse width measurement circuit 11, and this is remeasured at every frame pulse because the frequency of the reproduced signal itself varies due to a variation in rotation of a motor for rotating the optical disk carrier 100 and, therefore, nx is not always equal to 3.

In this third embodiment of the invention, the frequency error signal FE is converted to a pulse signal to avoid an extreme increase in the gain of the frequency control. In order to convert the frequency error signal FE to a pulse signal, the pulse generator 25 is used and a generated pulse is multiplied by an output from the subtracter 143. However, means for generating a pulse is not restricted thereto. For example, a pulse signal produced by appropriately dividing a signal output from the asynchronous clock generator 10 may be used. Alternatively, a pulse signal produced from the synchronized clock signal CK may be used. In the latter case, since the pulse width is in inverse proportion to the frequency, the gain is fixed regardless of the operating frequency of the PLL.

The above-described frequency control is executed when a defect occurs and the synchronizing error detection signal ASYN exceeds the threshold VTH to open the gate 21. Therefore, if the frequency of the synchronized clock signal CK is deviated in a moment due to the defect, it is immediately restored to a frequency in the stationary state. Since the phase control using the PLL circuit is performed regardless of the presence of defect, although the PLL circuit is not operated normally during the presence of defect due to noise, it enters the phase synchronized state as soon as the frequency enters the capture range after the defect has been passed. If the frequency control functions immediately after the defect has been passed as described above, the frequency of the synchronized clock signal does not deviate from the stationary frequency, so that the phase control is performed immediately after the defect has been passed. As a result, the absolute value of the phase error approaches zero, and the synchronizing error detection signal ASYN becomes lower than the threshold VTH, whereby the defect detecting flag signal DFCT is automatically reset.

Another feature of the third embodiment of the invention resides in that a malfunction caused by noise in a defect is avoided. More specifically, if the detection of the maximum length mark is continued during the presence of defect, a "maximum length" noise signal is unfavorably detected. If the frequency of the VCO 5 is adjusted to the signal, the frequency is further deviated. Therefore, in this third embodiment of the invention, when the defect detecting flag signal DFCT is generated, the operation of the digital comparator 12 is held, i.e., halted, by the signal DFCT. Thereby, the frequency control during the presence of defect or immediately after the defect has been passed is performed with, as a target value, an accurate time length of a reference signal that is obtained just before the defect, so that the adverse influence of noise is completely avoided.

Figure 9:
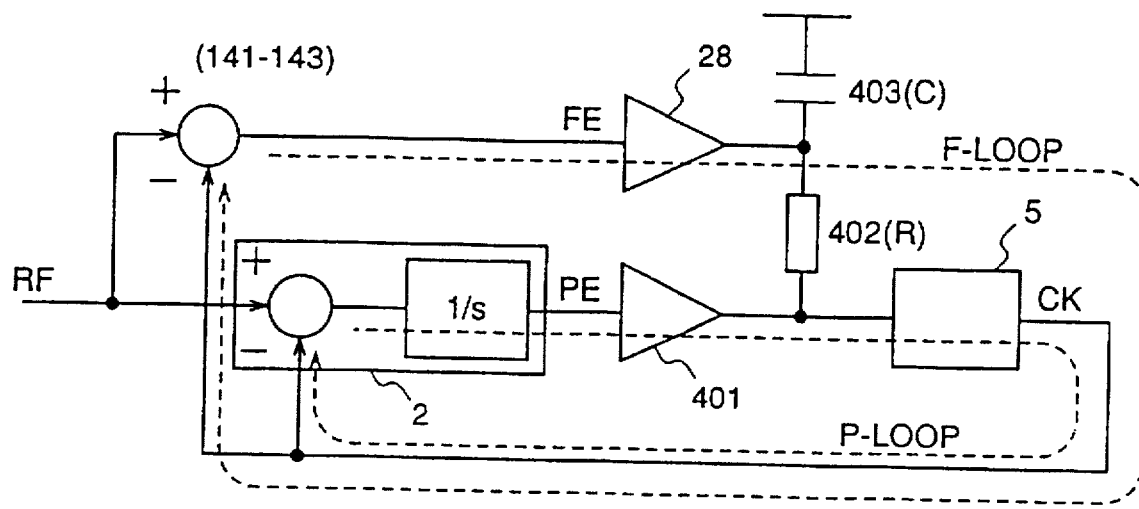
FIG. 9 is a functional block diagram illustrating a phase control system and a frequency control system according to the third embodiment of the invention.

A description is given of a method of making the phase control coexist with the frequency control. FIG. 9 is a block diagram in which the phase control system and the frequency control system shown in FIG. 7 are functionally simplified. When a frequency is taken as a reference, the digital comparators 141 and 142 and the subtracter 143 are regarded as a single differential means. In addition, the phase detector 2 is regarded as a frequency to phase converter comprising a differential means and an integral element (1/2s) as shown in FIG. 9. The gain relationship is appropriately normalized. The open loop characteristic of the phase control system (P-LOOP) is obtained by multiplying the characteristic of the first loop-filter that is determined by the resistor (R) 402 and the capacitor (C) 403 by an integral element. The filter characteristic is represented by a primary integral characteristic of 20 dB/dec for a band region lower than a cut-off frequency 1/2πRC that is determined by the resistor R and the capacitor C and by a flat characteristic of 0 dB/dec for a band region higher than the cut-off frequency. Therefore, when the filter characteristic is multiplied by an integral element of 20 dB/dec, it is represented by FIG. 10(a), and the loop characteristic is decided by the point of intersection between the 20 dB/dec curve and the 0 dB line.

Figure 10:
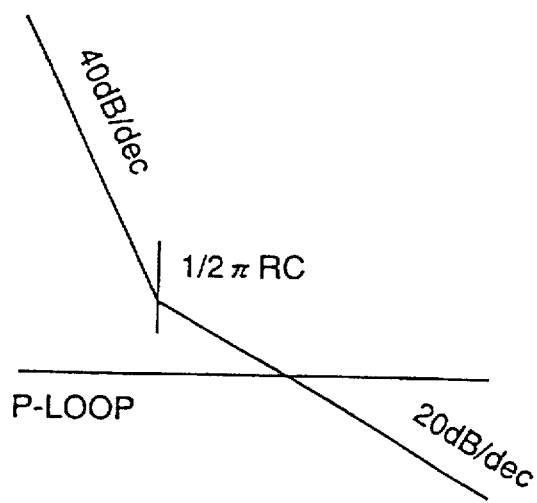
FIGS. 10(a)-10(c) are open loop diagrams for explaining the operation according to the third embodiment of the invention.
Figure 10:
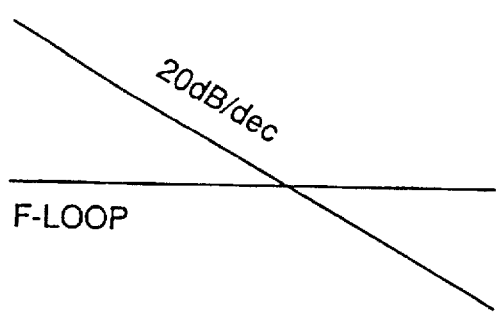
Figure 10:
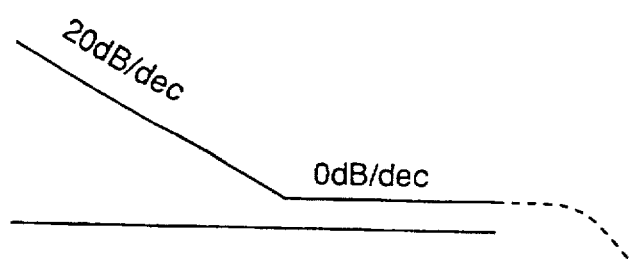

On the other hand, since the frequency control does not have an integral element, such as a phase detector, when a loop filter identical to the loop filter used in the phase control system is used in the frequency control system, the band region higher than the cut-off frequency becomes flat (0 dB/dec) as shown in FIG. 10(c), and the point of intersection with the 0 dB line is not decided. When the gain is reduced, an intersection with the 0 dB line is possible in the band region lower than the cut-off frequency. In this case, however, the response characteristic is reduced, so that a rapid frequency leading-in as described above is not carried out. So, as shown in FIG. 9, when a change pump output in the frequency control system is applied to the capacitor 403 of the loop-filter so that the resistor 402 is completely neglected, in other words, when only the integral element constituting the loop filter 4 is used as a second loop filter, the open loop characteristic becomes a primary integral characteristic of 20 dB/dec and intersects the 0 dB line, as shown in FIG. 10(b). As a result, a frequency leading-in can be realized at an appropriate speed.

According to the third embodiment of the present invention, an optical disk device comprises a synchronizing error detecting means for outputting a signal ASYN in response to an absolute value of a phase error between an information signal PRF and a synchronized signal CK, and producing a defect detecting signal DFCT in response to the signal ASYN; a frequency and phase synchronizing means comprising a phase comparing means for detecting a phase error between the information signal and the synchronized signal, frequency comparing means for detecting a frequency error of the synchronized signal on the basis of the time length of the reference signal, and a frequency variable means for controlling the phase or the frequency of the synchronized signal in response to the phase error or the frequency error; and a defect restoring means 200b for making an output from the frequency comparing means effective when the defect detecting signal is produced. In this circuit structure, frequency control is executed without holding the PLL when a defect occurs. Therefore, after the defect has been passed, the defect detecting flag resets itself and a rapid leading-in of phase control is realized.

Although in the second and third embodiments of the invention a measured maximum pulse width is compared with a specified maximum pulse width to reset a defect flag, a measured minimum pulse width may be compared with a specified minimum pulse width. In this case, the bit number of the counter or the latch register can be decreased, whereby the device is realized at a reduced cost. Furthermore, the defect flag may be reset by detecting a specified pattern that can be detected asynchronously, for example, a pattern of a combination mark that is not seen in the codec rule, in place of detecting that the pulse width is maximum or minimum.

[EMBODIMENT 4]

A description is given of an optical disk device in accordance with a fourth embodiment of the present invention. In this fourth embodiment, a method of setting an appropriate threshold for a signal reproduced from an optical disk carrier and digitizing this signal will be described.

As a conventional method for digitizing a signal reproduced from an optical disk carrier, the above-mentioned threshold is feedback-controlled so that the sum of H periods (first value) and the sum of L periods (second value) of a pulse signal obtained by digitizing the reproduced signal in a unit time interval become equal to each other, i.e., the duty ratio becomes 1. However, this method is realized on the condition that a recorded modulation signal is composed of H (1) and L (0) in the same number in a unit time interval, in other words, it is DC free. EFM (Eight-to-Fourteen Modulation) codes employed in a CD almost satisfy this condition. However, in order to secure that the modulation signal is DC free, in the EFM codec rule, 3-bit additional codes for making the modulation signal DC free and for limiting the run length must be added to convert the 8-bit original information to 17 bits, whereby the redundancy is unfavorably increased.

In case of (2, 7) modulation using RLL codes, an 8-bit original information is converted to 16 bits, so that the redundancy is reduced some what. However, the ratio of the number of "1" to the number of "0" in a unit time interval is unbalanced, and the recorded modulation signal is not DC free.

When a reproduced signal for which such non-DC-free codes are used is digitized by the above-described method, a feedback for compulsorily making the number of "1" and the number of "0", which are originally different from each other, equal to each other, is applied, whereby the threshold level is unfavorably deviated from an optimum level, i.e., so-called DC drift occurs.

Japanese Published Patent Applications Nos. Sho.60-103720 and Hei.2-94916 proposed techniques for solving the above-described problems. That is, when a PLL functions on a digitized information reproduced signal (reproduced pulse signal) and a signal synchronization is confirmed (in the publication No. 2-94916, it is confirmed by detection of a re-sync mark), the reproduced pulse signal is serially latched with a synchronized clock signal produced by the PLL. Then, a threshold level for digitization is decided so that the duty ratio of the reproduced pulse signal is equal to the duty ratio of the latched pulse signal. Thereby, an appropriate threshold level is decided so that the duty ratio of the reproduced signal becomes a ratio of "1" to "0" which are included in a recorded signal in any unit time, whereby the above-mentioned DC drift does not occur.

However, the techniques disclosed in these publications are realized on the condition that the signal latched with the clock nearly coincides with the signal before it is recorded. If these signals are adversely affected by noise due to a defect and do not coincide with each other, the threshold cannot be decided accurately, and the control system becomes unstable, resulting in a run away of the threshold.

Furthermore, in the publications mentioned above, the duty ratio of the latched signal is compared with the duty ratio of the reproduced pulse signal during the operation of the PLL. However, even though the noise is not so considerable that the PLL runs off, when the threshold level runs away, a reproduced signal is not obtained any more. As a result, the PLL unfavorably runs off.

Figure 11:
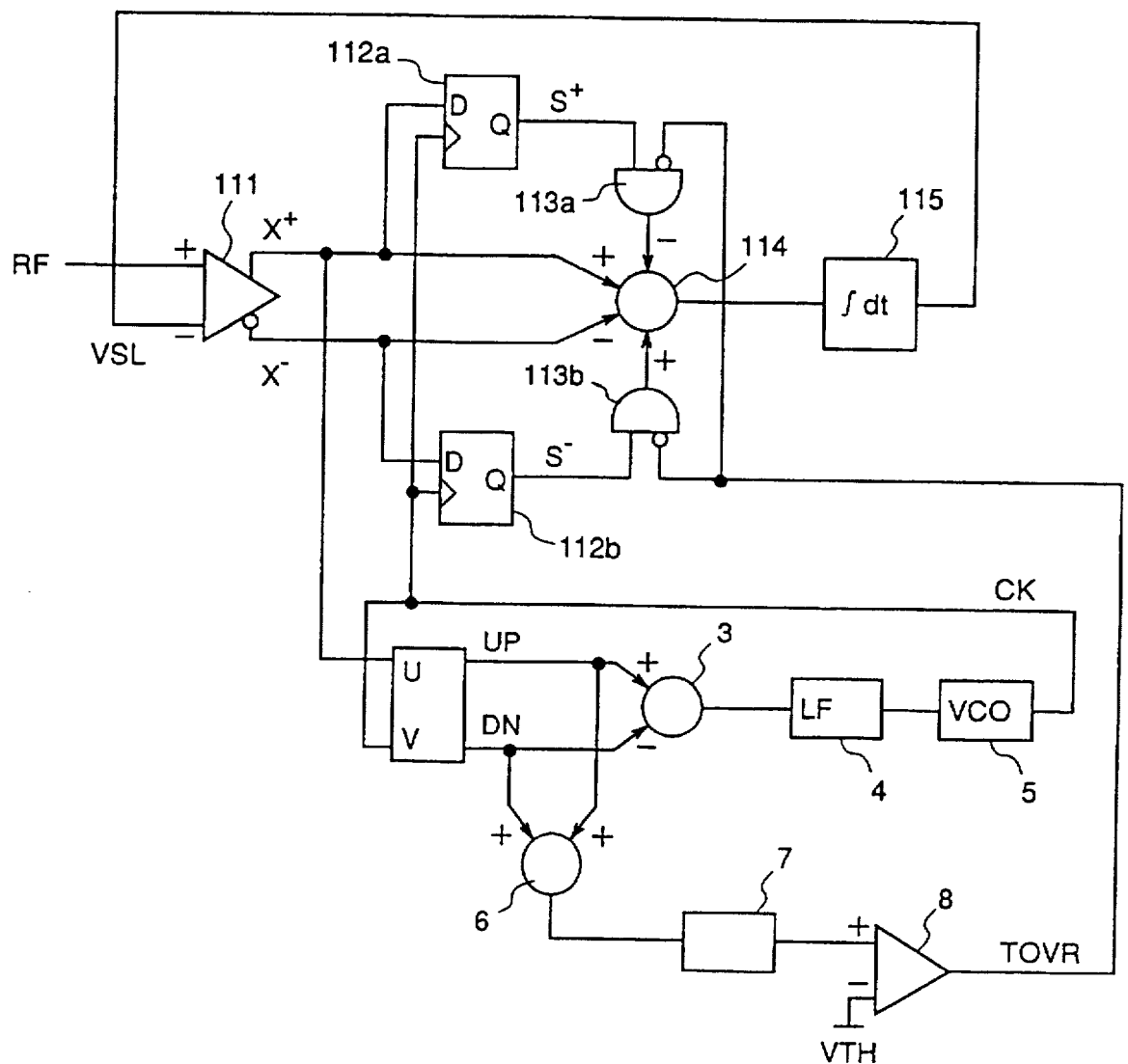
FIG. 11 is a block diagram illustrating a signal digitizer included in an optical disk device in accordance with a fourth embodiment of the present invention.
Figure 12:
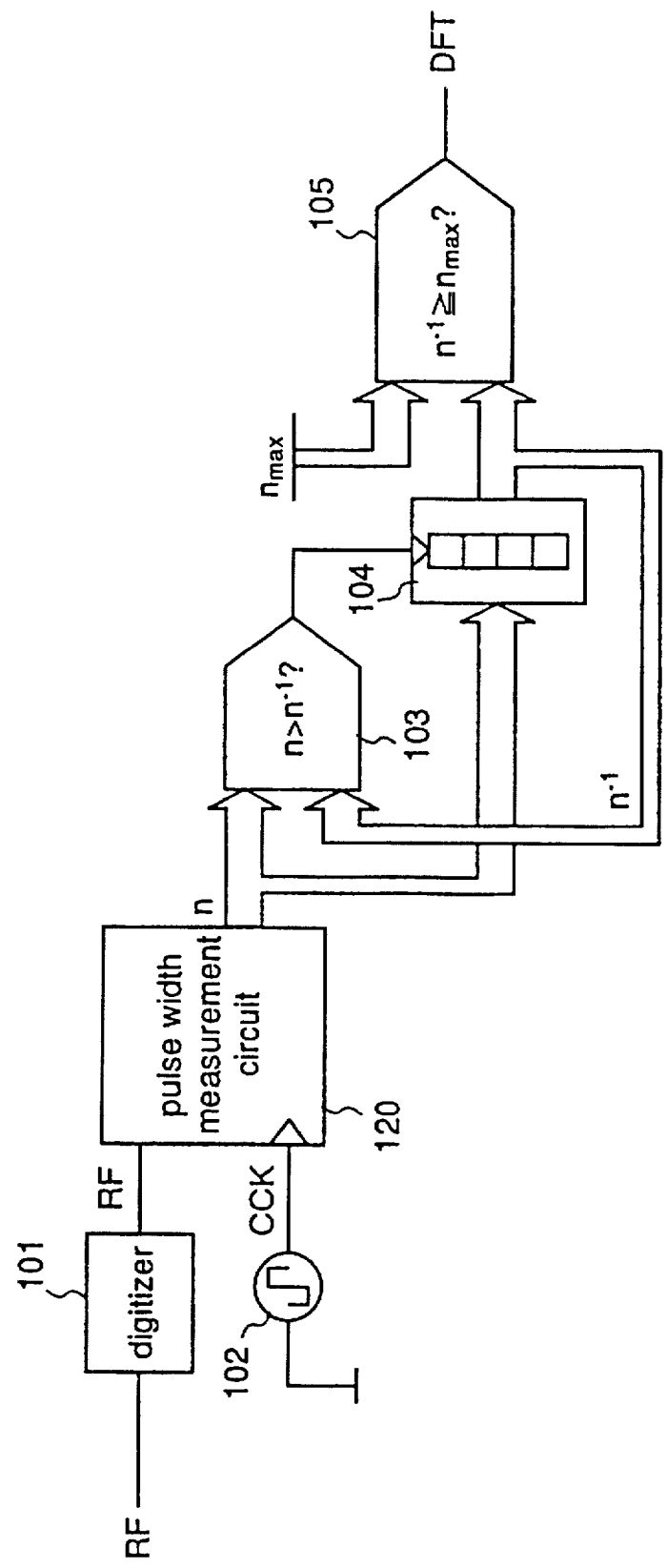
FIG. 12 is a block diagram illustrating a defect detector in accordance with the prior art.

In this fourth embodiment of the invention, a signal digitizer that operates with high stability even in the above-described case is proposed. FIG. 11 is a block diagram illustrating an optical disk device including a signal digitizer according to the fourth embodiment of the invention. In FIG. 11, reference numeral 111 designates a voltage comparator. The voltage comparator 111 outputs a digitized signal $X^+$ that changes from L to H when a reproduced signal RF exceeds a threshold voltage VSL and a digitized signal $X^-$ which changes from H to L. The digitized signals $X^+$ and $X^-$ have the positive logic and the negative logic, respectively. Reference numerals 112a and 112b designate flip-flops that latch the digitized signals $X^+$ and $X^-$ with a synchronized clock signal CK to produce latched signals, i.e., reference signals, $S^+$ and $S^-$, respectively. The synchronized clock signal CK is synchronously generated from the digitized signal $X^+$ by a PLL circuit comprising a phase detector 2, a differential amplifier 3, a loop-filter 4, and a VCO 5. The clock signal CK may be generated from the digitized signal $X^-$. Reference numeral 114 designates an addition and subtraction amplifier, and reference numeral 115 designates an integrator. The amplifier 114 and the integrator 115 calculate following equation (1) and feeds the result back to the voltage comparator 111.

$$VSL=\int\{(X^+-X^-)-(S^+-S^-)\}dt \qquad (1)$$

As a result, the threshold voltage VSL is decided so that following equation is satisfied in the stationary state.

$$(X^+-X^-)-(S^+-S^-)=0 \qquad (2)$$

Since $X^+$ and $S^+$ are complementary to $X^-$ and $S^-$, respectively, equation (2) is realized only when $$X^+=S^+ \quad X^-=S^- \qquad (3)$$

That is, as a result of the appropriate control of the threshold level, the digitized signal coincides with the latched signal. In other words, the threshold is appropriately decided.

However, equation (1) is in the stationary state and equation (2) or (3) is realized only when the latched signal $S^+$ ($S^-$) coincides with the signal before recording and does not vary with the variation in the threshold. Generally, in order to keep a feedback circuit system stable, the system must form a negative feedback loop. In the system shown in FIG. 11 or by equation (1), since $(X^+-X^-)$ is a function to the feedback variable VSL, it is only required to make $(X^+-X^-)$ form a negative feedback. That is, as a result of a slight increase in the threshold VSL, $(X^+(VSL)-X^-(VSL))$ is slightly decreased, and the threshold VSL is lowered according to equation (1). However, since $(S^+-S^-)$ is opposed in phase to $(X^+-X^-)$ in equation (1), when $(X^+-X^-)$ forms a negative feedback, $(S^+-S^-)$ forms a positive feedback apparently.

If $(S^+-S^-)$ does not vary with the variation in the threshold VSL, i.e., $(S^+-S^-)$ is regarded as a constant, it does not contribute to the operation of the feedback system at all. In fact, however, the latch signal ($S^+$–$S^-$) is a variable that varies by stages with the variation in the threshold VSL. As described above, signals recorded in an optical disk are composed of combinations of pulse sequences having widths of $(n_{min})T$, $(n_{min}+1)T$, . . . nT . . . , $(n_{max})T$ (T: reference clock period). When the threshold level is deviated by d when these signals are reproduced and digitized, the pulse width of the digitized signal $X^+$ ($X^-$) that originally has a pulse width of nT becomes $(n-\delta(d))T$, wherein $\delta(d)$ is a variation of the pulse width and it is represented as a function that unconditionally increases with the threshold level variation d.

When $$-T/2 < \delta(d) < +T/2 \tag{4}$$

the pulse width of the signal $S^+$ ($S^-$) that has latched the variation $\delta(d)$ is always restored to nT. However, when the variation of the threshold VSL exceeds the range represented by formula (4), the pulse width of the latched signal would be $(n-1)T$ or $(n+1)T$.

When the pulse width of the latched signal $S^+$ ($S^-$) is once decreased or increased due to the variation in the threshold VSL, the above-described positive feedback occurs. The positive feedback encourages the variation in the threshold and, finally, the threshold level exceeds the amplitude of the reproduced signal. This phenomenon easily occurs due to a defect with noise, such as interruption.

In this fourth embodiment of the invention, the pulse width variation $\delta(d)$ is detected and, when the variation $\delta(d)$ exceeds the range given by formula (4), the positive feedback due to the latched signal ($S^+$–$S^-$) is prevented. In FIG. 11, the adder 6, the time to voltage converter 7, and the voltage comparator 8 operate in the same manner as those shown in FIG. 1. As a result, an absolute value of a variation in the leading time of the digitized signal $X^+$ with respect to the leading of the synchronized clock signal CK is converted to a voltage and then it is output. This absolute value is identical to an absolute value of the deviation from nT, i.e., $|\delta(d)|$. Therefore, by appropriately setting the threshold VTH of the voltage comparator 8, the deviation of $\delta(d)$ from the range given by formula (4) is informed by a flag TOVR. Since the range of formula (4) is a permissible limit, for a practical threshold VTH, the permissible range is desired to be narrowed so that the flag TOVR rises at a value of $|\delta(d)|$ smaller than T/2.

When the gates 113a and 113b are closed by the flag TOVR, both $S^+$ and $S^-$ become 0, whereby the positive feedback loop is cut off. As a result of the disappearance of $S^+$ and $S^-$, the digitized signals $X^+$ and $X^-$ seem to lose the control target. However, equation (1) is reduced to $$VSL = \int (X^+ - X^-) dt \tag{5}$$

and the reproduced signal digitizing threshold is controlled so that the following equation is realized.

$$X^+ = X^- \tag{6}$$

That is, a normal threshold decision feedback in which the duty ratios of the digitized signals are equal to each other is carried out.

According to the fourth embodiment of the invention, an optical disk device comprises a comparing means 111 for digitizing an information signal RF with an appropriate threshold VSL, a first feedback means (a loop of 114, 115, and 111) for deciding the threshold by performing a negative feedback of a signal in response to a difference in appearance frequencies in a unit time interval between a first value $X^+$ and a second value $X^-$ of the digitized signal, a second feedback means (a loop of 112a, 112b, 113a, 113b, 114, 115, and 111) for substantially forming a positive feedback closed circuit by applying, to the first feedback means, a signal in response to a difference in appearance frequencies in a unit time interval between a first value $S^+$ and a second value $S^-$ of a reference signal that is obtained by serially latching the digitized signal with a synchronized clock signal that is produced synchronously with the digitized signal, and a feedback control means (6, 7, 8, 113a, and 113b) for controlling the feedback of the second feedback means in response to a defect detecting signal TOVR that is produced in response to an absolute value of a phase error between an information signal PRF including a reference signal REF that can be detected asynchronously and a synchronized signal CK that is synchronously produced from the information signal. Therefore, an appropriate threshold can be set to a non-DC-free reproduced signal. Further, a signal digitizer that operates stably regardless of a defect can be realized.

In the fourth embodiment of the invention, a threshold is set for a variation $\delta$ of the pulse width, and a positive feedback loop to which a latched signal is supplied is cut off when the threshold is exceeded. However, the gain of the positive feedback loop may be decreased by stages in response to the variation $\delta$ and made zero, i.e., the positive feedback loop is cut off, when a threshold is exceeded.

The constructions according to the first to fourth embodiments of the invention have the effects on any disturbances, not restricted to scratches on a disk or a track jumping. For example, in recent years, an optical disk having a multilayer information face has been proposed. In such an optical disk, when a signal reproduction is jumped from a recording face to another recording face, a focus is deviated in a moment. When the present invention is applied to this case, a PLL and a signal digitizer can be operated stably.

What is claimed is:

1. An optical disk device comprising:

synchronizing error signal detecting means for outputting a signal in response to an absolute value of a phase error between an information signal including a reference signal that can be detected asynchronously and a synchronized signal that is synchronously produced from the information signal;

decision means for producing a defect detecting signal in response to the absolute value of the phase error;

means for asynchronously measuring an information transition interval of the information signal for a prescribed period of time; and means for terminating the defect detecting signal in response to a measured value of a time length of the reference signal, that is detected by the measuring means in the period of time.

2. The optical disk device of claim 1 wherein a maximum value and a minimum value are defined for the information transition interval of the information signal, and the reference signal is a signal having one of the maximum information transition interval and the minimum information transition interval in a group of signals constituting the information signal.

3. The optical disk device of claim 1 comprising:

phase comparing means for producing a first pulse signal having a time interval equivalent to a phase lead of the information transition of the information signal from the synchronized signal and generating a second pulse signal having a time interval equivalent to a phase lag of the information transition of the information signal from the synchronized signal;

wherein a difference signal between the first pulse signal and the second pulse signal is a phase error, and a sum of the first pulse signal and the second pulse signal is output as an absolute value of the phase error.

4. The optical disk device of claim 3 comprising:

first time to voltage converting means for injecting a current into a capacitor while a pulse signal is present, sampling and holding a voltage at both ends of the capacitor after the pulse signal is terminated, and discharging electric charges stored in the capacitor until a next pulse signal is supplied; and second time to voltage converting means functioning in the same manner as the first time to voltage converting means;

wherein a logical sum of the first pulse signal and the second pulse signal is supplied to the first time to voltage converting means;

a logical product of the first pulse signal and the second pulse signal is supplied to the second time to voltage converting means; and a difference signal of output signals from the first and second time to voltage converting means is output as an absolute value of the phase error.

5. The optical disk device of claim 1 comprising:

phase synchronizing means comprising;
    phase comparing means for detecting a phase error between the information signal and the synchronized signal, and
    frequency variable means for controlling a phase of the synchronized signal in response to the phase error; and gate means for making the output from the phase comparing means ineffective in response to the defect detecting signal.

6. The optical disk device of claim 5 comprising:

clock signal generating means for generating a measuring clock signal asynchronously with the synchronized signal;

measurement means for digital-counting the information transition interval using the measuring clock signal;

memory means for temporarily holding a measured value output from the measurement means;

first digital comparing means for serially comparing the measured value with a value stored in the memory means within a prescribed period of time, and detecting a maximum or minimum information transition interval;

second digital comparing means for comparing a measured value of the maximum or minimum information transition interval with a reference value that is specified in advance, and producing a coincidence signal when these values coincide each other within a prescribed error; and means for producing the defect detecting signal immediately after the absolute value of the phase error exceeds a prescribed threshold, and resetting the defect detecting signal with the coincidence signal.

7. The optical disk device of claim 1 comprising:

frequency and phase synchronizing means comprising;
    phase comparing means for detecting a phase error between the information signal and the synchronized signal,
    frequency comparing means for detecting a frequency error of the synchronized signal on the basis of the time length of the reference signal, and
    frequency variable means for controlling the phase or the frequency of the synchronized signal in response to the phase error or the frequency error; and defect restoring means for making an output from the frequency comparing means effective when the defect detecting signal is produced.

8. The optical disk device of claim 7 comprising:

means for detecting the frequency error from a difference between the information transition interval of the reference signal and a period of a signal obtained by M division (M: integer) of the synchronized signal when the information transition interval of the reference signal in the synchronized state is M times as long as the period of the synchronized signal.

* * * * *